United States Patent
Ramsey (10) Patent No.: US 11,485,204 B2
(45) Date of Patent: Nov. 1, 2022

(54) AFTERMARKET DOOR ASSEMBLY FOR EXTENDED SEMI-TRUCK CAB

(71) Applicant: Fontaine Modification Company, Charlotte, NC (US)

(72) Inventor: Jack Dylan Ramsey, Midland, NC (US)

(73) Assignee: Fontaine Modification Company, Charlotte, NC (US)

( * ) Notice: Subject to any disclaimer, the term of this patent is extended or adjusted under 35 U.S.C. 154(b) by 261 days.

(21) Appl. No.: 16/898,649

(22) Filed: Jun. 11, 2020

(65) Prior Publication Data

US 2021/0046809 A1  Feb. 18, 2021

Related U.S. Application Data

(60) Provisional application No. 62/886,099, filed on Aug. 13, 2019.

(51) Int. Cl.
  *B60J 5/04* (2006.01)
  *B60J 5/08* (2006.01)
  *B62D 33/04* (2006.01)

(52) U.S. Cl.
  CPC ............... *B60J 5/0463* (2013.01); *B60J 5/08* (2013.01); *B62D 33/04* (2013.01)

(58) Field of Classification Search
  CPC ...... B62D 65/06; B62D 65/024; B62D 33/04; B60J 5/0463; B60J 5/08
  USPC .................................................... 29/897.2
  See application file for complete search history.

(56) References Cited

U.S. PATENT DOCUMENTS

| | | | |
|---|---|---|---|
| 4,157,201 A | 6/1979 | Collins et al. | |
| 5,083,834 A | 1/1992 | Moffatt et al. | |
| 5,615,922 A | 4/1997 | Blanchard | |
| 2016/0129764 A1* | 5/2016 | Beaupre | B62D 31/02 |
| | | | 156/99 |
| 2020/0324631 A1* | 10/2020 | von Nothaus | B60J 5/08 |
| 2021/0094395 A1* | 4/2021 | Hamrick | B60J 5/0412 |
| 2021/0128372 A1* | 5/2021 | Jones | B60J 5/0477 |

FOREIGN PATENT DOCUMENTS

FR  1349712 A  *  1/1964

* cited by examiner

*Primary Examiner* — Hilary L Gutman
(74) *Attorney, Agent, or Firm* — Andrus Intellectual Property Law, LLP (57) ABSTRACT

A door interface system for installing a door in a vehicle having a floor, a roof, and an outer panel with a hole defined therein. The system includes a door frame assembly configured to be coupled to the floor of the vehicle adjacent to the hole in the outer panel, and upper braces configured to be coupled to the door frame assembly and to the roof of the vehicle. The system further includes a floor support configured to be coupled to the vehicle adjacent to the hole in the outer panel near a bottom edge of the hole, and one or more trim pieces configured to be coupled to the outer panel and to the door frame assembly. The system further includes structural braces configured to be coupled to the door frame assembly and to the vehicle.

20 Claims, 4 Drawing Sheets

AFTERMARKET DOOR ASSEMBLY FOR EXTENDED SEMI-TRUCK CAB

CROSS REFERENCE TO RELATED APPLICATIONS

This application claims the benefit of U.S. Provisional Patent Application No. 62/886,099, filed Aug. 13, 2019, which is incorporated herein by reference in its entirety.

FIELD/BACKGROUND

The present disclosure relates to a door interface system for installing a door in a vehicle, and particularly an aftermarket door having a first profile that is straight within an outer panel of the semi-truck cab having a second profile that is curved.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of the present disclosure generally relates to a door interface system for installing a door in a vehicle having a floor, a roof, and an outer panel with a hole defined therein. The system includes a door frame assembly configured to be coupled to the floor of the vehicle adjacent to the hole in the outer panel, and upper braces configured to be coupled to the door frame assembly and to the roof of the vehicle. The system further includes a floor support configured to be coupled to the vehicle adjacent to the hole in the outer panel near a bottom edge of the hole, and one or more trim pieces configured to be coupled to the outer panel and to the door frame assembly. The system further includes structural braces configured to be coupled to the door frame assembly and to the vehicle.

Another embodiment generally relates to a method for modifying a vehicle such that an aftermarket door is installable therein, where the vehicle has a floor, a roof, and an outer panel with a hole defined therein. The method includes positioning a door frame assembly adjacent to the hole in the outer panel, coupling the door frame assembly to the floor of the vehicle, and coupling upper braces to the door frame assembly and to the roof of the vehicle. The method further includes coupling a floor support to the vehicle adjacent to the hole in the outer panel near a bottom edge of the hole and coupling one or more trim pieces to the outer panel and to the door frame assembly. The method further includes coupling structural braces to the door frame assembly and to the vehicle. The door frame assembly is configured to be coupled to the aftermarket door to thereby install the aftermarket door within the vehicle.

Another embodiment generally relates to a door interface system for installing an aftermarket door having a first profile in a semi-truck cab having a floor, a roof, and an outer panel having a second profile and a hole defined therein. The system includes a door frame assembly configured to be coupled to the floor of the semi-truck cab adjacent to the hole in the outer panel. The door frame assembly includes a front frame piece having an upper portion, a lower portion, a flat face to which the aftermarket door is to coupleable, and a curved edge opposite the flat face wherein the curved edge is adjacent to a front edge of the hole in the outer panel of the semi-truck cab. The door frame assembly also includes a rear frame piece having an upper portion, a lower portion, a flat face to which the aftermarket door is coupleable, and a curved edge opposite the flat face wherein the curved edge is adjacent to a rear edge of the hole. The door frame assembly further includes an upper frame piece having a first end and a second end defining an upper frame length therebetween, wherein the upper frame piece is connected to the upper portion of the front frame piece and the upper portion of the rear frame piece, and wherein the upper frame length is generally equal to an upper length of a top edge of the hole. The door frame assembly further includes a lower frame piece having a first end and a second end defining a lower frame length therebetween, wherein the lower frame piece is connected to the lower portion of the front frame piece and the lower portion of the rear frame piece and is configured to be coupled to the floor of the semi-truck cab, and wherein the lower frame length is generally equal to a lower length of a bottom edge of the hole. The system further includes one or more upper braces configured to connect the upper portion of the front frame piece and the upper portion of the rear frame piece to the roof of the semi-truck cab, and a floor support configured to be coupled to the semi-truck cab adjacent to the hole in the outer panel near a bottom edge of the hole. The system further includes one or more trim pieces configured to be coupled to the outer panel and to the door frame assembly, and one or more structural braces configured to be coupled to the door frame assembly and to the semi-truck cab. The first profile of the aftermarket door is substantially straight and the second profile of the outer panel is curved.

BRIEF DESCRIPTION OF THE DRAWINGS

The present disclosure is described with reference to the following Figures. The same numbers are used throughout the Figures to reference like features and like components.

DETAILED DESCRIPTION

The following describes exemplary embodiments of an aftermarket door assembly according to the present disclosure that incorporate a door frame assembly and other components to which an aftermarket door can be installed. The aftermarket door assembly provides a platform in the side of a truck cab to attach an aftermarket door in order to allow easier access to the interior of a truck cab. The aftermarket door assembly of the present disclosure includes a door frame assembly coupled to the floor of a semi-truck cab, a floor support coupled to the floor and inner panel of the cab for reinforcing the cab structure, one or more upper braces to couple the door frame assembly to the roof structure of the cab, one or more trim pieces coupled to the outer panel of the truck cab, and one or more structural braces coupling the door frame assembly to the inner panel of the cab. In the embodiment of the present disclosure, the door frame assembly has a front frame piece and a rear frame piece to which an aftermarket door can be attached. The front and rear frame pieces are coupled together by upper and lower frame pieces to form a frame. The lower frame piece couples the door frame assembly to the floor. Various upper braces and structural braces provide further stability for the door frame assembly as well as for other portions of the interior of the cab and additional external features. Trim pieces seal the hole in the outer panel of the cab by covering the gap created between the edges of the hole and the door frame assembly.

Figure 1:
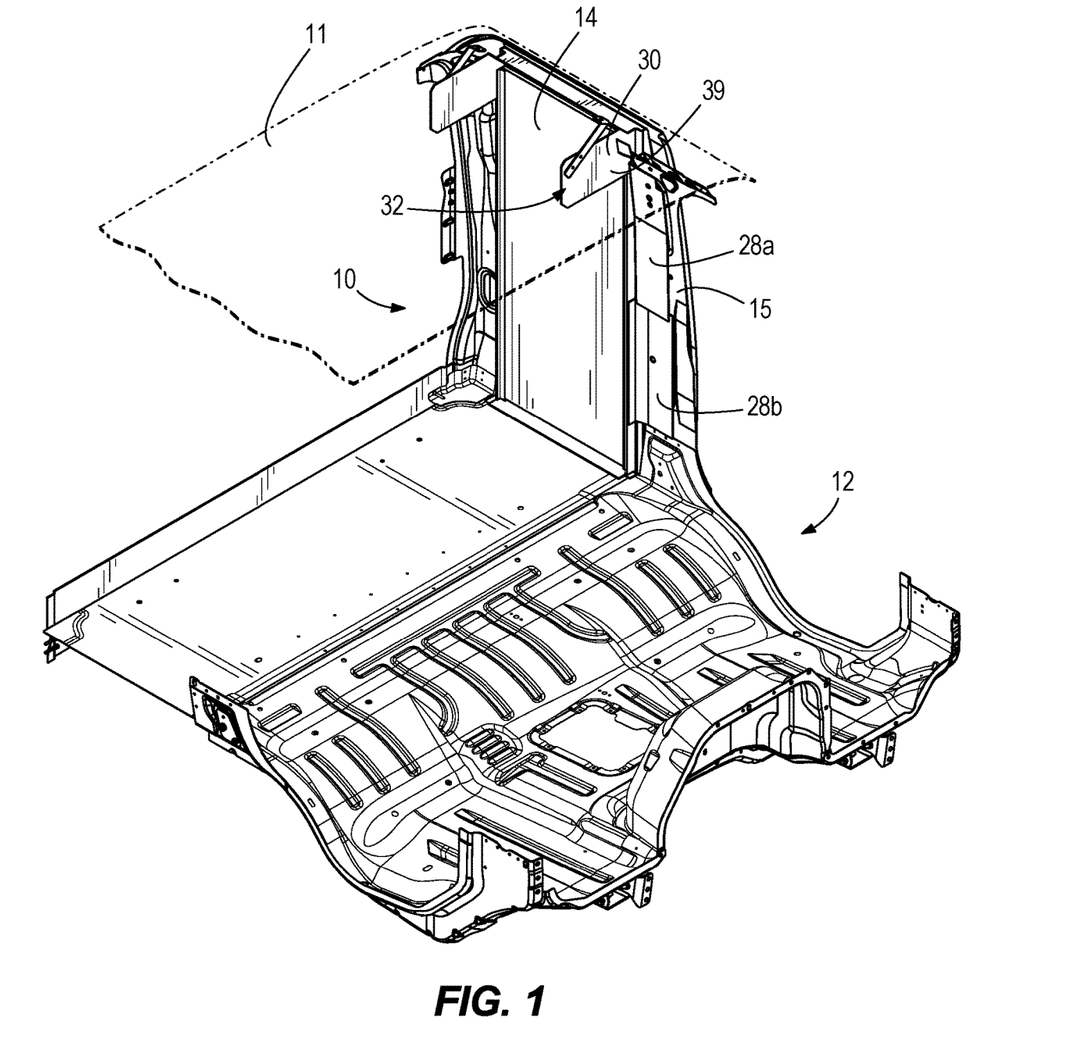
FIG. 1 illustrates a first perspective view of the interior of a truck cab with an aftermarket door and aftermarket door assembly of the present disclosure installed.

Referring to FIG. 1, an aftermarket door assembly 10 is provided to be installed inside a semi-truck cab 12 to which an aftermarket door 14 can be attached. In order to provide better access to the interior of the cab 12 of a truck, such as an extended-cab truck manufactured by Navistar, Freightliner, or other original equipment manufacturers, it is possible to add an aftermarket door 14 to the side of the cab 12 to allow the driver or others to easily reach into the interior of the cab 12 to retrieve objects without the hassle of climbing between seats in the cab 12. A common style of aftermarket door 14 used in various segments of the truck aftermarket equipment industry is a roll-up door, such as one manufactured by ROM Corporation of Belton, Mo. A roll-up door provides the same level of accessibility to a storage area as a hinged swinging door does but it allows better accessibility where space may be constrained and a swinging door may not be possible to use, such as when working along the side of a cab 12 on a heavy-traffic roadside. Accessibility in areas of limited space is especially appreciated by segments of large truck-purchasing consumers such as those who use trucks for vehicle repair, emergency response, utility work, or other service industries. While the present disclosure principally discusses the installation of an aftermarket door 14 with respect to a truck, it should be recognized that the presently disclosed systems and methods are also applicable to vans, marine vessels, and/or other vehicles of containers having an outer panel that does not generally match the contour of the tracks for a given aftermarket door.

Figure 2:
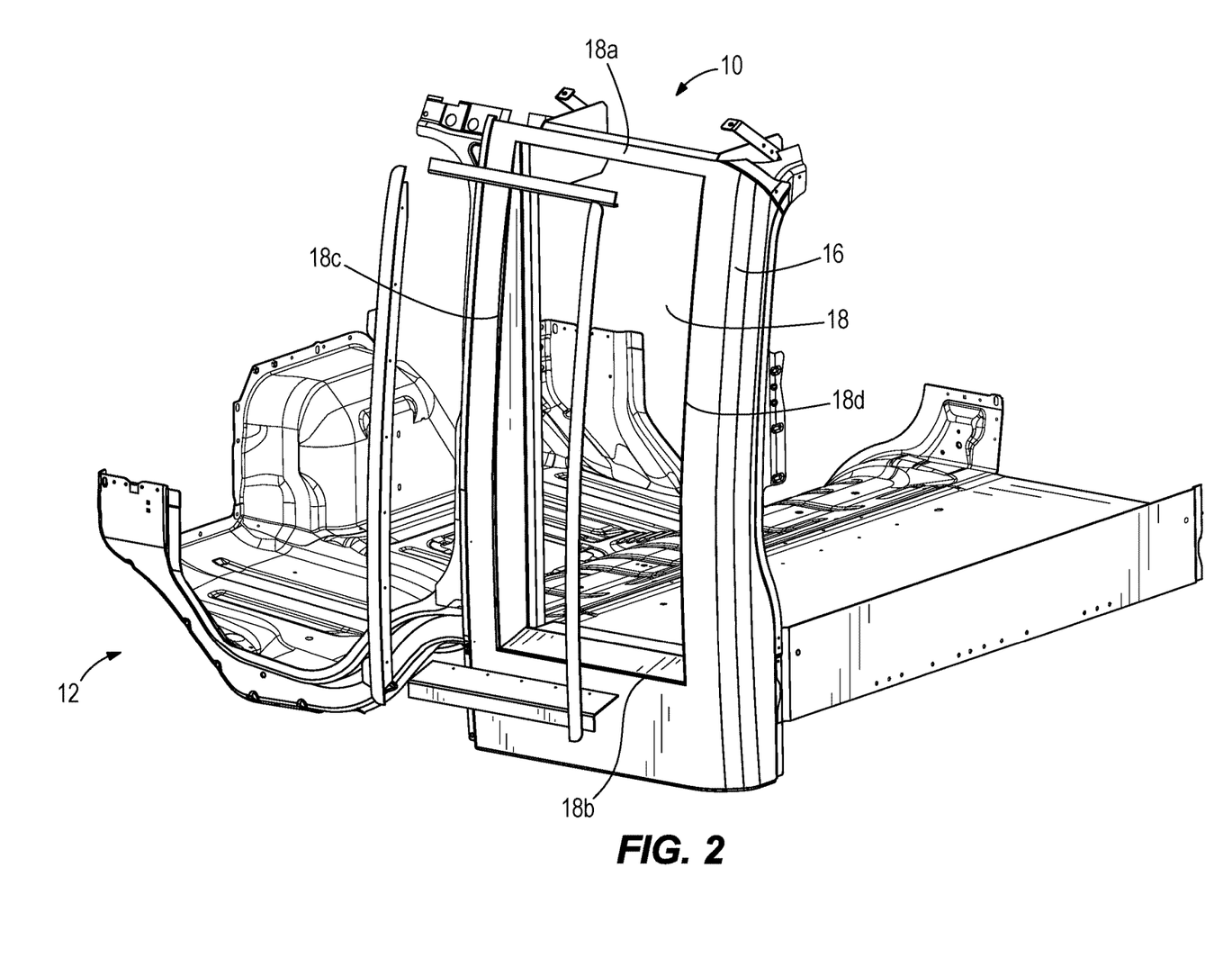
FIG. 2 illustrates an exploded perspective view of the exterior of a truck cab with a hole in the outer panel and an aftermarket door assembly of the present disclosure.

Referring now to FIG. 2, it can be seen that a challenge arises when installing a roll-up aftermarket door 14 because the side outer panels 16 of the cab 12 because the door 14 and the outer panels 16 have different profiles. In the example shown, the outer panels 16 are curved, either for aesthetics, aerodynamics, or other considerations, whereas a roll-up aftermarket door 14 is typically designed and manufactured to have straight side tracks, the parts in which the roll-up door is installed. A common practice in the aftermarket modifications industry is to cut and remove sections of the door track, whereby these sections of the door track are then be bent to match the curvature of the outer panel 16 prior to installing the track in the cab 12. The bent track is attached, typically by gluing, to the outer panel 16 of the cab 12. This practice poses several problems. The first is that once installed in the cab 12, the door is not serviceable. If an inoperable door needs to be replaced with a functioning door, the entire outer panel 16 of the cab 12 would need to be removed and replaced. Another problem with the practice of cutting and bending the tracks of the roll-up door and then gluing them to the outer panel 16 of the cab 12 is that the cab 12 becomes less structurally-sound. Specifically, installing the door in this manner requires the removal of material interior to the cab 12, thereby resulting in a loss of the structure originally provided with the cab 12. The present invention addresses those two problems by providing for an aftermarket door assembly 10, to which an aftermarket door 14 can be installed. In other words, the presently disclosed systems and methods enable an existing aftermarket door 14 as presently known in the art to be installed in the cab 12 without requiring the aftermarket door 14 to have the same curve as the outer panel 16 of the cab 12.

To begin, a hole 18 is cut in the outer panel 16 of the cab 12, for example by using a unique template based on the curvature of the outer panel 16 and size of the aftermarket door 14 to installed. As shown in FIG. 2, this hole 18 provides the area adjacent to which the aftermarket door 14 is to be installed, and in this example is defined as a rectangle having a top edge 18a, a bottom edge 18b, a front edge 18c, and a rear edge 18d. The hole 18 as shown in the embodiments of the present disclosure is located on the driver side of the cab 12; however, the hole could also or instead be located on the passenger side of the cab 12, and/or in other locations.

Figure 3:
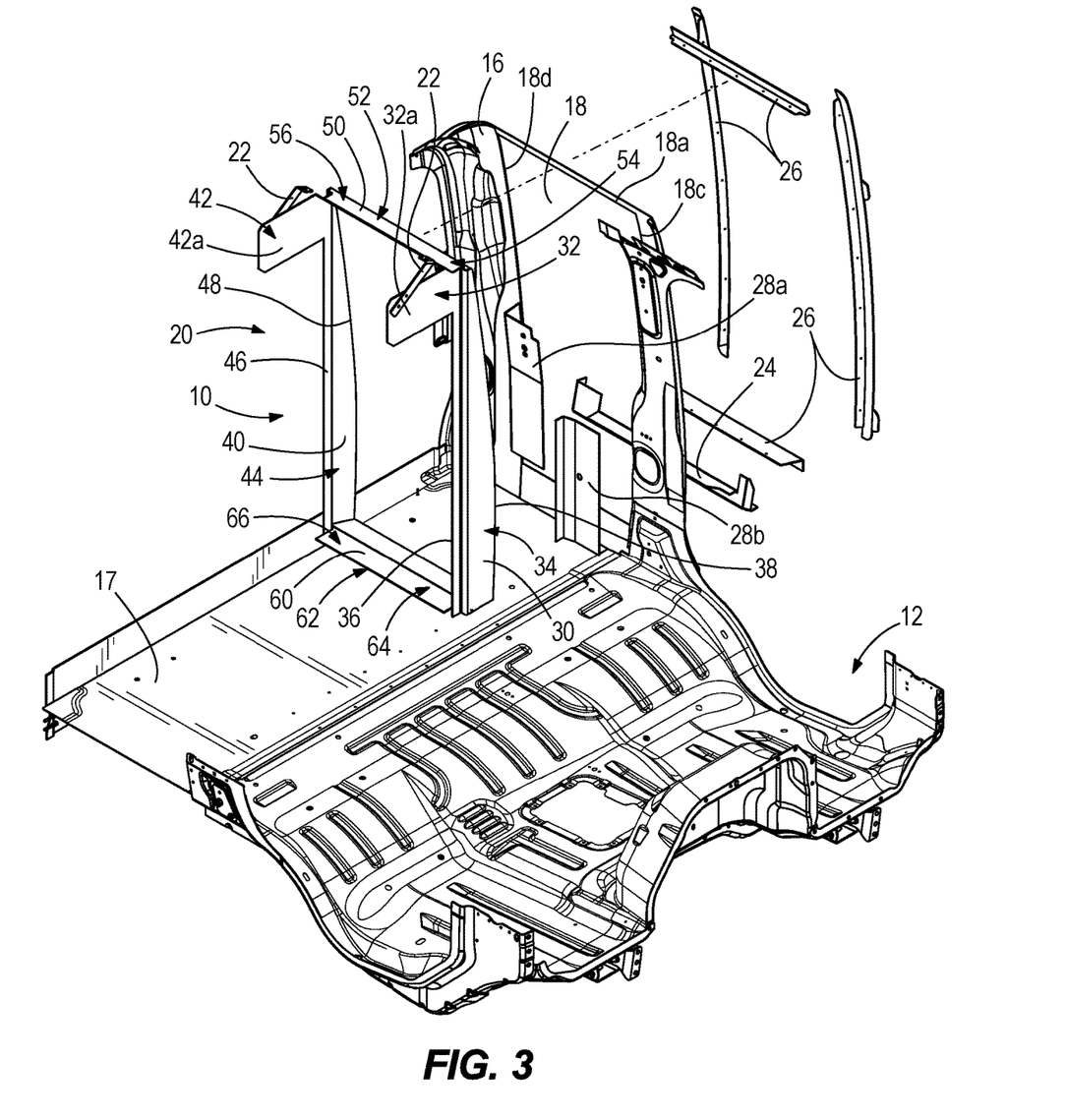
FIG. 3 illustrates a second exploded perspective view showing components of the aftermarket door assembly of the present disclosure.

Referring now to FIG. 3, an aftermarket door assembly 10 is shown. In the present invention, the aftermarket door assembly 10 includes a door frame assembly 20, one or more upper braces 22, a floor support 24, one or more trim pieces 26, and one or more structural braces 28a, 28b. Each will be addressed in further detail below. In the present embodiment, the door frame assembly 20 includes a front frame piece 30, a rear frame piece 40, an upper frame piece 50, and a lower frame piece 60. The front frame piece 30 is connected to the rear frame piece 40 by the upper frame piece 50 and the lower frame piece 60.

In the present disclosure, the front frame piece 30 has an upper portion 32 and a lower portion 34, with the upper portion 32 being at the top of the front frame piece 30 away from the floor 17 of the cab 12 and the lower portion 34 being adjacent to the floor 17. Spanning between the upper portion 32 and the lower portion 34 of front frame piece 30 are a flat face 36, having an outer curved edge 38. The flat face 36 faces inwardly into the door frame opening and is the portion of the front frame piece 30 to which the track of the aftermarket door 14 can be attached after the aftermarket door assembly 10 is installed in the cab 12. It will be appreciated that other styles of aftermarket door 14 may require additional attachment features incorporated as part of the front frame piece 30.

The aftermarket door assembly 10 is to be installed in the cab 12 so that the curved edge 38 of the front frame piece 30 is adjacent to the front edge 18c of the hole 18 in the outer panel 16. The curvature of the curved edge 38 in this example is identical to the curvature of the inside face of the outer panel 16. In the embodiment shown in FIG. 3, the front frame piece 30 incorporates a leg 32a extending toward the interior of the cab 12 from the upper portion 32 adjacent to the flat face 36. This additional leg 32a provides for a mounting surface for a roller assembly of a roll-up-style aftermarket door 14. However, it will be appreciated that other embodiments to which components of an aftermarket door 14 can also or alternatively be incorporated.

In the present embodiment, the rear frame piece 40 has an upper portion 42 and a lower portion 44, with the upper portion 42 being at the top of the rear frame piece 40 away from the floor 17 and with the lower portion 44 being adjacent to the floor 17. Spanning between the upper portion 42 and the lower portion 44 of the rear frame piece 40 are a flat face 46 having an outer curved edge 48. The flat face 46 is the portion of the rear frame piece 40 to which the other track of the aftermarket door 14 can be attached after the aftermarket door assembly 10 is installed in the cab 12. However, it will be appreciated that other door styles may require other attachment features incorporated in the rear frame piece 40. The aftermarket door assembly 10 is to be installed in the cab 12 so that the curved edge 48 of the rear frame piece 40 is adjacent to the rear edge 18*d* of the hole 18 in the outer panel 16. In the present example, and as discussed with respect to the front frame piece 30, the curvature of the curved edge 48 is identical to the curvature of the inside face of the outer panel 16 of the cab 12. In the embodiment shown in FIG. 3, the rear frame piece 40 incorporates a leg 42*a* extending toward the interior of the cab 12 from the upper portion 42 adjacent to the flat face 46. This additional leg 42*a* provides for a mounting surface for a roller assembly of a roll-up style aftermarket door 14. It will be appreciated that other embodiments to which components of an aftermarket door 14 can also or alternatively be incorporated.

The upper frame piece 50 of the door frame assembly 20 has an upper frame length 52 defined as the length between a first end 54 and a second end 56 of the upper frame piece 50. Due to the sizing and use of the roll-up style aftermarket door 14, the upper frame length 52 is generally equal to the length of the top edge 18*a* of the hole 18 in the outer panel 16. The upper frame piece 50 is attached to the upper portion 32 of the front frame piece 30 and to the upper portion 42 of the rear frame piece 40, for example at top edges of the front frame piece 30 and the rear frame piece 40. The upper frame piece 50 of the embodiment of this disclosure has a generally L-shaped cross-section in order to provide structural strength to the door frame assembly 20; however, other embodiments can be used as appropriate.

It should also be recognized that the attaching or coupling of elements as described herein may be via a variety of conventionally known methods, including welding, the use of fasteners such as bolts or screws, and/or integrally formed via casting and other fabrication methods, for example.

The lower frame piece 60 of the door frame assembly 20 has a lower frame length 62 defined as a length between a first end 64 and a second end 66 of the lower frame piece 60. Due to the sizing and use of a roll-up style aftermarket door 14, the lower frame length 62 is generally equal to the length of the bottom edge 18*b* of the hole 18 in the outer panel 16. The lower frame piece 60 is attached to the lower portion 34 of the front frame piece 30 and to the lower portion 44 of the rear frame piece 40. The embodiment of lower frame piece 60 in the present disclosure is of a generally flat piece having two faces: a first face that is generally parallel to the floor 17 of the cab 12, and a second face sloping slightly downwardly into the cab 12.

In the embodiment shown, the front frame piece 30 is attached to the upper frame piece 50 and the lower frame piece 60 by welding. However, those of skill in the art can appreciate that other types of attachment can be used, as discussed above. Likewise, the rear frame piece 40 is attached to the upper frame piece 50 and lower frame piece 60 by welding, for example.

The door frame assembly 20 is configured to be installed in the interior of the cab 12, attached to the floor 17 of the cab 12, adjacent to the hole 18 in the outer panel 16. The door frame assembly 20 is configured to be installed in cab 12 such that the front frame piece 30 of the door frame assembly 20 is located closer to the front of the cab 12 and the rear frame piece 40 is located toward the rear of the cab 12 and further rearward than the front frame piece 30. Of course, one having ordinary skill in the art would understand that the frame pieces are reversed when the door is installed on the opposite side of the cab 12. Exemplary attachment methods for coupling the door frame assembly 20 to the floor 17 include riveting, screwing, or otherwise fastening the lower frame piece 60 of the door frame assembly 20 to the floor 17; however, other fasteners known to those of skill in the art can be used.

Still referring to FIG. 3, the aftermarket door assembly 10 of the present disclosure incorporates one or more upper braces 22. The one or more upper braces 22 connect the door frame assembly 20 to the existing roof structure 11 of the cab 12. By connecting the door frame assembly 20 to the roof structure 11, the one or more upper braces 22 add additional strength, stability, and stiffness to the door frame assembly 20, as well as provide support for the aftermarket door 14. In certain examples, the one or more upper braces 22 are attached to the upper portion 32, 42 of the front frame piece 30 and rear frame piece 42, respectively. In the present embodiment, the one or more upper braces 22 attach to the leg 32*a* of the front frame piece 30 and the leg 42*a* of the rear frame piece 40 extending from the upper portion 32, 42 of those respective frame pieces 30, 40. In the present example, the one or more upper braces 22 are attached to the front and rear frame pieces 30, 40 by bolts; however, other attachment methods known to those of skill in the art can be used, such as welding, riveting, or screwing.

In the present embodiment, the one or more upper braces 22 are generally L-shaped, with a leg extending for attachment to the front and rear frame pieces 30, 40, and a second leg generally at a 90° angle to the first leg for attachment to the roof structure 11 (FIG. 1). One example of attachment of the one or more upper braces 22 to the roof structure 11 is by use of bolts. Alternatively, threaded fasteners could be used to attach, for example, to a threaded nut-sert installed in the roof structure 11.

Figure 4:
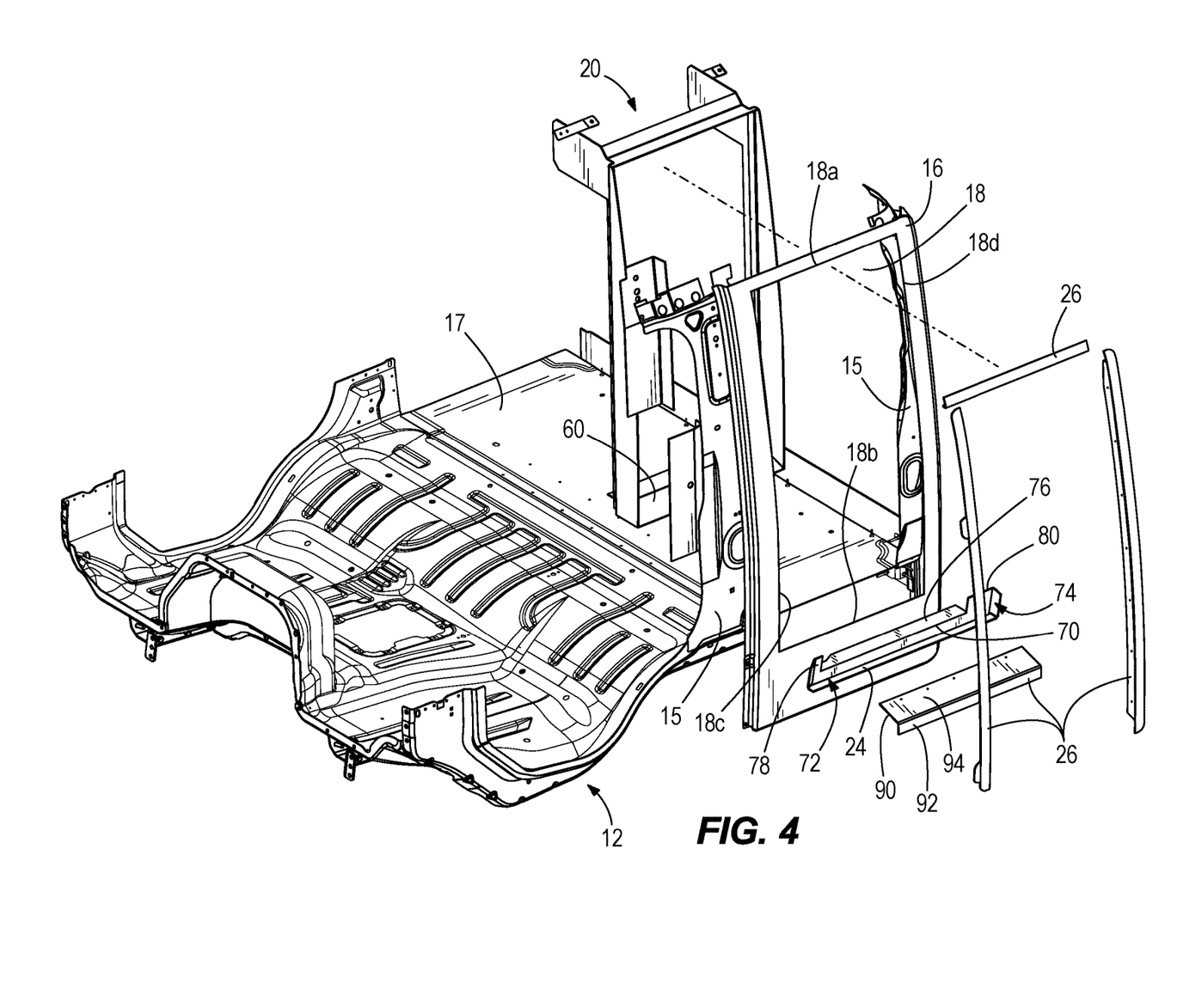
FIG. 4 illustrates a third exploded perspective view showing components of the aftermarket door assembly of the present disclosure.

Referring now to FIG. 4, an embodiment of the floor support 24 is shown. The floor support 24 is to be installed adjacent to the bottom edge 18*b* of the hole 18 in the outer panel 16. The floor support 24 strengthens the structure of the cab 12 by coupling the floor 17 of the cab 12 to the existing inner panel 15 of the cab 12 in order to compensate for the loss of structure that resulted from creating a hole 18 in the cab 12. The floor support 24 of the present disclosure has a generally vertical face 70 spanning between a front end 72 and rear end 74, with the front end 72 being installed closer to the front of the cab 12 and the rear end 74 installed further from the front of the cab 12. Between the front end 72 and the rear end 74, a generally horizontal flange 76 extends such that when the floor support 24 is installed in the cab 12, the horizontal flange 76 extends into the interior of cab 12. In certain embodiments, the horizontal flange 76 is parallel to the floor 17 when installed. Located at the front end 72 and rear end 74 of the floor support 24 are a front vertical flange 78 and a rear vertical flange 80, respectively. When installed, the front and rear vertical flanges 78, 80 are attached to the outer face of the inner panel 15 of the cab 12. One exemplary method to attach the floor support 24 to the inner panel 15 is by riveting; however, other appropriate attachment devices could be used, such as welding, bolting, or screwing, for example.

As shown in the present embodiment, the horizontal flange 76 is installed so that the horizontal flange 76 is sandwiched between the floor 17 and the lower frame piece 60 of the door frame assembly 20, and is therefore attached by way of the screws or other fasteners used to attach the lower frame piece 60 to the floor 17. As previously discussed, other ways of attachment are known to those of skill in the art.

To prevent water and/or debris from entering between the gaps of the door frame assembly 20 and the outer panel 16 of the cab 12, one or more trim pieces 26 are installed around the edges 18a, 18b, 18c, 18d of the hole 18. These one of more trim pieces 26 may be attached to one or both of the outer panel 16 and the door frame assembly 20. The one or more trim pieces 26 of the present embodiment each have a generally L-shaped cross section 90 so that the pieces generally match the approximately 90° angle formed by the outer panel 16 and the door frame assembly 20. Referring to the lower trim piece by way of example, the first leg 92 of the cross-section 90 is attached to the outer panel 16, for example by using adhesive material and seam sealer in order to prevent ingress of water or debris. The second leg 94 of the cross-section 90 is attached to the door frame assembly 20. Such attachment can be by riveting the second leg 94 to the door frame assembly 20; however, other attachment methods could be used. It should be understood that the other three trim pieces 26 of the present embodiment have similar first and second legs for attachment to the outer panel 16 and the door frame assembly 20, respectively. The present embodiment uses four separate trim pieces 26 to seal the gap between the edges 18a, 18b, 18c, 18d of the outer panel 16. However, other embodiments may use one, two, three, five, or more trim pieces.

Referring back to FIG. 1, the aftermarket door assembly 10 includes one or more structural braces 28a, 28b for further strengthening the cab 12 and stabilizing the aftermarket door assembly 10. The one or more structural braces 28a, 28b attach a front face 39 of the front frame piece 30 to the inner panel 15 of the cab 12. The one or more structural braces 28a, 28b can be attached to the front face 39 of the front frame piece 30 by riveting the one or more structural braces 28a, 28b to the front face 39; however, other attachment methods can be used. The one or more structural braces 28a, 28b in the present example are attached to the inner panel 15 using rivets, for example.

One structural brace shown in the present embodiment is a seat belt structural brace 28a. The seat belt structural brace 28a is installed near the upper portion 32 of the front frame piece 30 in order to provide additional structure for a seat belt attachment. The seat belt structural brace 28a includes holes for attaching the existing seat belt in the cab 12. The seat belt structural brace 28a in certain examples is attached to the inner panel 15 by rivets.

Another structural brace shown in the present embodiment is a grab handle structural brace 28b. A grab handle structural brace 28b is added to provide additional structure and support to which a factory option grab handle (not shown) can be attached internal or external to the cab 12. This grab handle provides stability for a person while the person reaches into the storage area created by the aftermarket door 14, or to provide a handle for the person to pull to assist in entry into the storage area, for example. If the grab handle is installed external to the cab 12, access holes may be cut in the inner and/or outer panels 15, 16 of the cab 12 to allow for such installation. The grab handle structural brace 28b of the present embodiment is shown having holes for attachment of a grab handle by threaded attachment; however, other attachment devices and/or methods can be used as well. One manner of attaching the grab handle structural brace 28b to the inner panel 15 is by rivets.

To assemble the aftermarket door assembly 10 of the present disclosure, the hole 18 is first cut through the inner and outer panels 15, 16 of the existing cab 12, such as according to a template, which may have dimensions that are slightly smaller than those of the door frame assembly 20 for reasons noted herein below. The floor support 24 is then attached between the inner panel 15 and the existing floor 17, closing the gap created therebetween by the cutting of the hole 18. The door frame assembly 20 is then placed adjacent the hole 18 from inside the cab 12 and adjacent to the inner panel 15. The hole 18 is then be trimmed from its initially smaller size to fit the marked dimensions of the door frame assembly 20 such that no large gaps exist between the door frame assembly 20 and the inner and outer panels 15, 16.

The door frame assembly 20 is then be installed in the trimmed hole 18, with the outer curved edges 38, 48 of the front and rear frame pieces 30, 40, respectively, abutting the inside face of the outer panel 16. The outer trim pieces 26 is then be attached, according to the methods described herein above. The structural braces 28a, 28b are attached to the door frame assembly 20 and the inner panel 15, and the upper braces 22 are attached to the roof structure 11 of the cab 12. Finally, the aftermarket door 14 is inserted into the door frame assembly 20 by attaching the tracks thereof to the straight up-and-down flat faces 36, 46 of the front and rear frame pieces 30, 40, respectively. As mentioned, the roller of the aftermarket door 14 can be attached between the legs 32a, 42a of the front and rear frame pieces 30, 40.

Thus, the present disclosure details an assembly 10 for installing an aftermarket door 14, such as may be presently available in the market, in a hole 18 cut through an outer panel 16 and an inner panel 15 of an extended cab 12 of a truck. The assembly 10 includes a floor support 24 configured for installation at a bottom 18b of the hole 18 for coupling a floor 17 of the cab 12 to the cab's inner panel 15. A frame 20 is configured for installation within the hole 18, the door frame assembly 20 having two parallel upright sections 30, 40, a bottom section 60 connecting respective bottom ends 34, 44 of the upright sections 30, 40, and a top section 50 connecting respective top ends 32, 42 of the upright sections 30, 40. A pair of side trim sections 26, a lower trim section 26, and an upper trim section 26 are configured for installation on an outside face of the cab's outer panel 16 along opposing sides 18c, 18d, the bottom 18b, and a top 18a of the hole 18, respectively. Outermost edges 38, 48 of the upright sections 30, 40 of the frame 20 are curved so as to abut an inside face of the cab's outer panel 16, and inner portions of the upright sections 30, 40 of the frame are straight so as to allow for mounting of respective tracks of the aftermarket door 14 thereupon. The upright sections 30, 40 of the frame 20 extend at least between the inside face of the cab's outer panel 16 and the cab's inner panel 15 to close a gap therebetween.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies and methods described herein may be used alone or in combination with other assemblies and methods. It is to be expected that various equivalents, alternatives and modifications are possible.

What is claimed is:

1. A door interface system for installing a door in a vehicle having a floor, a roof, and an outer panel with a hole defined therein, the system comprising:
   a door frame assembly configured to be coupled to the floor of the vehicle adjacent to the hole in the outer panel;
   one or more upper braces configured to be coupled to the door frame assembly and to the roof of the vehicle;

a floor support configured to be coupled to the vehicle adjacent to the hole in the outer panel near a bottom edge of the hole;

one or more trim pieces configured to be coupled to the outer panel and to the door frame assembly; and a structural brace configured to be coupled to the door frame assembly and to the vehicle.

2. The system according to claim 1, wherein the door has a first profile and the outer panel has a second profile that is different from the first profile.

3. The system according to claim 2, wherein the first profile of the door is substantially straight and the second profile of the outer panel is curved.

4. The system according to claim 1, wherein the door frame assembly is configured such that an aftermarket roll-up door is coupleable thereto.

5. The system according to claim 1, wherein the door frame assembly comprises:

a front frame piece having an upper portion, a lower portion, a flat face to which the door is coupleable, and a curved edge opposite the flat face wherein the curved edge is adjacent to a front edge of the hole in the outer panel of the vehicle;

a rear frame piece having an upper portion, a lower portion, a flat face to which the door is coupleable, and a curved edge opposite the flat face wherein the curved edge is adjacent to a rear edge of the hole;

an upper frame piece having a first end and a second end defining an upper frame length therebetween, wherein the upper frame piece is connected to the upper portion of the front frame piece and the upper portion of the rear frame piece, and wherein the upper frame length is generally equal to an upper length of a top edge of the hole; and a lower frame piece having a first end and a second end defining a lower frame length therebetween, wherein the lower frame piece is connected to the lower portion of the front frame piece and the lower portion of the rear frame piece and is configured to be coupled to the floor of the vehicle, and wherein the lower frame length is generally equal to a lower length of the bottom edge of the hole.

6. The system according to claim 5, wherein the one or more upper braces are configured to connect the upper portion of the front frame piece and the upper portion of the rear frame piece to the roof of the vehicle.

7. The system according to claim 5, wherein the door frame assembly is configured such that an aftermarket roll-up door is coupleable thereto, and wherein the front frame piece and the rear frame piece each have an arm configured to extend inwardly into the vehicle, and the arms are configured to support a roller of the aftermarket roll-up door.

8. The system according to claim 5, wherein the front frame piece and the rear frame piece each extend at least between an inside face of the outer panel and an inner panel of the vehicle to close a gap therebetween.

9. The system according to claim 1, wherein the floor support comprises a generally vertical face having a front end and a rear end, and also a generally horizontal flange extending between the front end and the rear end, wherein a generally vertical front flange is disposed at the front end and a generally vertical rear flange is disposed at the rear end, and wherein the horizontal flange is configured to be coupled to the floor of the vehicle and the vertical flanges are configured to be coupled to an inner panel of the vehicle.

10. The system according to claim 1, wherein the one or more trim pieces have a generally L-shaped cross-section, wherein a first leg of the cross-section is configured to be connected to an outer surface of the outer panel of the vehicle, and a second leg of the cross-section is configured to be connected to the door frame assembly.

11. The system according to claim 5, wherein the structural brace is coupled to a front face of the front frame piece and configured to be coupled to an inner panel of the vehicle.

12. The system according to claim 1, wherein the structural brace is configured to couple the door frame assembly to an inner panel of the vehicle adjacent a front edge of the hole.

13. The system according to claim 12, wherein the structural brace is a seat belt structural brace and is configured to be attached to the inner panel adjacent a top edge of the hole.

14. The system according to claim 12, wherein the structural brace is a grab handle structural brace and is configured to be attached to the inner panel adjacent the door frame assembly.

15. A method for modifying a vehicle such that an aftermarket door is installable therein, the vehicle having a floor, a roof, and an outer panel having a hole defined therein, the method comprising:

positioning a door frame assembly adjacent to the hole in the outer panel;

coupling the door frame assembly to the floor of the vehicle;

coupling one or more upper braces to the door frame assembly and to the roof of the vehicle;

coupling a floor support to the vehicle adjacent to the hole in the outer panel near a bottom edge of the hole;

coupling one or more trim pieces to the outer panel and to the door frame assembly; and coupling a structural brace to the door frame assembly and to the vehicle;

wherein the door frame assembly is configured to be coupled to the aftermarket door to thereby install the aftermarket door within the vehicle.

16. The method according to claim 15, wherein the aftermarket door has a first profile and the outer panel has a second profile that is different from the first profile.

17. The method according to claim 16, wherein the first profile of the aftermarket door is substantially straight and the second profile of the outer panel is curved.

18. The method according to claim 15, further comprising coupling the structural brace to the door frame assembly and to an inner panel of the vehicle adjacent a front edge of the hole.

19. The method according to claim 15, wherein the structural brace is a grab handle structural brace.

20. A door interface system for installing an aftermarket door having a first profile in a semi-truck cab having a floor, a roof, and an outer panel having a second profile and a hole defined therein, the system comprising:

a door frame assembly configured to be coupled to the floor of the semi-truck cab adjacent to the hole in the outer panel, the door frame assembly including:

a front frame piece having an upper portion, a lower portion, a flat face to which the aftermarket door is coupleable, and a curved edge opposite the flat face wherein the curved edge is adjacent to a front edge of the hole in the outer panel of the semi-truck cab;

a rear frame piece having an upper portion, a lower portion, a flat face to which the aftermarket door is coupleable, and a curved edge opposite the flat face wherein the curved edge is adjacent to a rear edge of the hole;

an upper frame piece having a first end and a second end defining an upper frame length therebetween, wherein the upper frame piece is connected to the upper portion of the front frame piece and the upper portion of the rear frame piece, and wherein the upper frame length is generally equal to an upper length of a top edge of the hole; and a lower frame piece having a first end and a second end defining a lower frame length therebetween, wherein the lower frame piece is connected to the lower portion of the front frame piece and the lower portion of the rear frame piece and is configured to be coupled to the floor of the semi-truck cab, and wherein the lower frame length is generally equal to a lower length of a bottom edge of the hole;

one or more upper braces configured to connect the upper portion of the front frame piece and the upper portion of the rear frame piece to the roof of the semi-truck cab;

a floor support configured to be coupled to the semi-truck cab adjacent to the hole in the outer panel near the bottom edge of the hole;

one or more trim pieces configured to be coupled to the outer panel and to the door frame assembly; and one or more structural braces configured to be coupled to the door frame assembly and to the semi-truck cab;

wherein the first profile of the aftermarket door is substantially straight and the second profile of the outer panel is curved.

* * * * *